June 19, 1945.    M. H. MARTIN    2,378,647
TRUCK
Filed July 14, 1943    2 Sheets-Sheet 1
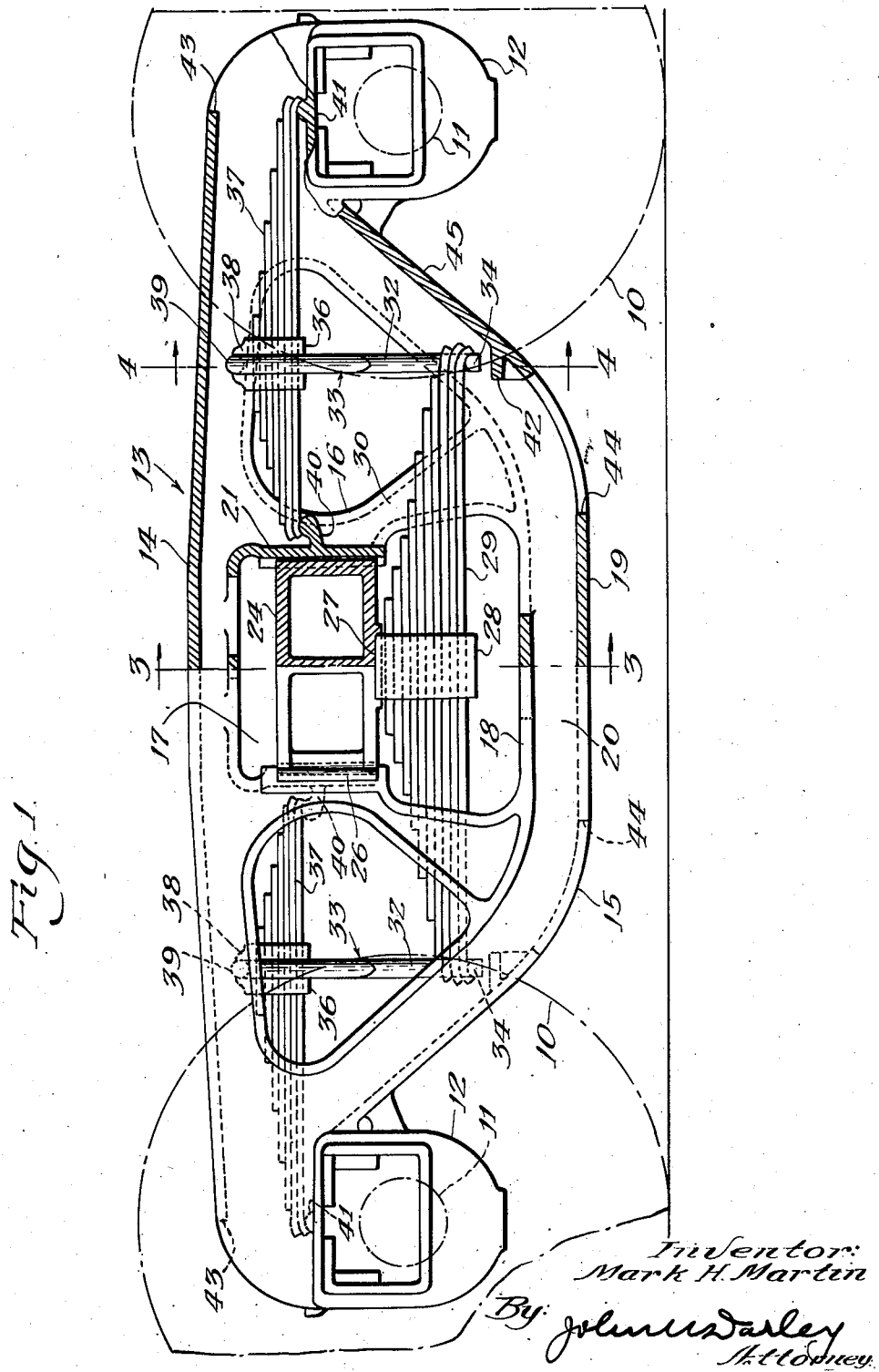

June 19, 1945.  M. H. MARTIN  2,378,647
TRUCK
Filed July 14, 1943  2 Sheets-Sheet 2
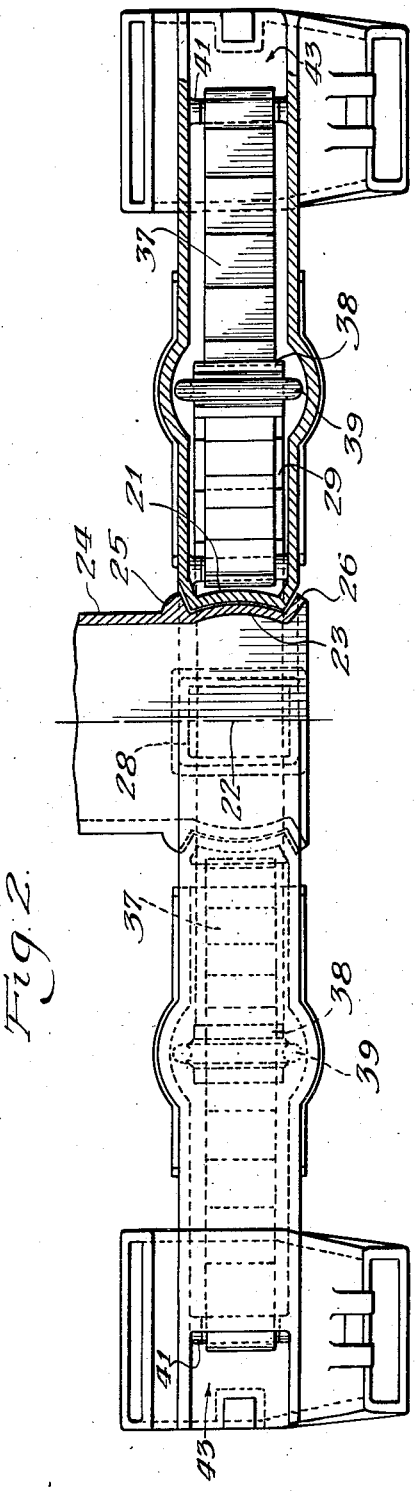
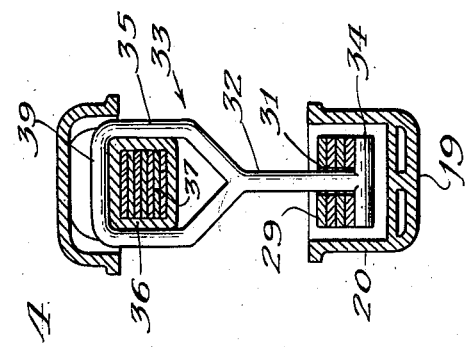
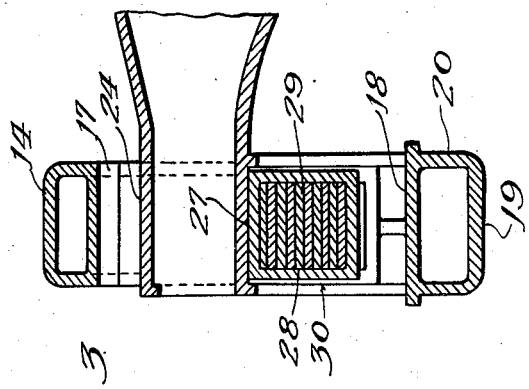
Inventor:
Mark H. Martin
By John W. Darley
Attorney Patented June 19, 1945

2,378,647

UNITED STATES PATENT OFFICE 2,378,647

TRUCK

Mark H. Martin, Reading, Pa., assignor to Birdsboro Steel Foundry and Machine Company, Birdsboro, Pa., a corporation of Pennsylvania Application July 14, 1943, Serial No. 494,593

35 Claims. (Cl. 105—197.2)

My invention relates to railway car trucks of the freight car type and, in particular, a truck characterized by good riding qualities, capacity for high speed service, and maximum strength per pound of weight for satisfying all static and dynamic requirements.

The simple truss type of side frame which is now used in great numbers by the railroads and in which the bolster load is applied to a shallow beam section between the bolster guide columns has long been recognized as not completely meeting the increased loadings of freight cars. With this type of side frame, the spring suspension, regardless of its character and arrangement, generally concentrates the bolster load on the frame inwardly of the bolster guide columns and against the spring seat portion of the frame. In other words, the load is concentrated usually at the center of the frame so that the full strength potentialities of this type of frame design in relation to weight are not realized. The concentrated loading produces too much deflection of the spring seat part of the frame.

It is therefore one object of my invention to provide a truck equipped with simple truss side frames, only slightly modified from the ordinary frame of this design, which, in conjunction with an improved spring suspension, insures a better distribution of the bolster load to the side frames than is obtained in previous designs with a resulting economy of metal in the frame and low average maximum fibre stresses.

A further object is to provide a truck in which none of the bolster load is delivered to the side frames inwardly of the bolster guide columns, regardless of the loaded condition of the car.

A further object is to provide a truck of the character indicated in which the spring suspension accommodates movements of the bolster in taking up clearance between the bolster and the guide columns of the frame.

A further object is to devise a spring assembly for simple truss side frames which includes only work absorptive or leaf springs, preferably of the semi-elliptic type, certain of the springs supporting the car when unloaded or partly loaded and absorbing shocks delivered to the side frames by the wheels passing over rail joints and irregular track, and other springs being designed to carry the fully loaded car.

Other features include provision for limiting the deflection of the lighter capacity springs, the bridging of these springs between the bolster guide columns and the roofs of the journal boxes, and the support of the heavier springs on the lighter springs under conditions of light or no load.

These and further objects of my invention will be set forth in the following specification, reference being had to the accompanying drawings, and the novel means by which said objects are effectuated will be definitely pointed out in the claims.

In the drawings:

Fig. 1 is a side elevation of the truck, partly in section.

Fig. 2 is a top, plan view of one of the side frames and the associated end of the bolster, all partly in section.

Figs. 3 and 4 are sections along the lines 3—3 and 4—4, respectively, in Fig. 1 showing certain details of construction.

Referring to the drawings, there is illustrated a spring plankless truck in which the side frames incorporate so-called radial column guides to provide a controlled relative movement between the bolster and side frames and hence a controlled flexibility of the truck. The truck is equipped with the usual wheels 10 and journals 11 which are received within journal boxes 12 having conventional wedges and brasses (not shown). The boxes are located at the ends of and preferably formed integrally with a generally hollow side frame 13 comprising a compression member 14, a tension member 15 and bolster guide columns or strut portions 16 which space intermediate portions of the compression and tension members and define between the columns a bolster window opening 17. As illustrated the members are joined to each other and to the journal boxes 12, although the latter may be separately formed if desired and, in this event, the ends of the frame would be jaw-shaped in the well known manner.

Between the columns 16, the tension member is formed generally with a box section (see Fig. 3) comprising an upper web 18, a lower web 19, and side walls 20. Because of the arrangement of the spring suspension, as hereinafter described, and the distribution of the spring load on the side frame, it is unnecessary with my improved design to laterally extend the web 18 to provide spring shelves.

In the particular side frame illustrated, the columns 16 are provided with guiding surfaces 21 which are characterized by a concave, cylindrical curvature (see Fig. 2), the axis of the curvature coinciding with the vertical center line 22 of the side frame. The surfaces 21 have a guiding relation with complementary convex surfaces 23 provided on each end of a truck bolster 24 which may possess a box section and which is vertically slidable between the columns. This construction provides for a certain flexibility of the truck due to the capacity for relative movement between the bolster and side frames occasioned when one frame tends to lead the other. Full bearing contact between the bolster and frames is maintained during this movement in contrast to the limited and sometimes critical line contact between a straight side bolster and correspondingly shaped bolster columns under similar conditions which results in excessive wear and the loss of the preferred clearances between the bolster and columns. Endwise and angular movements of the bolster are limited by inner and outer, radial lugs 25 and 26, respectively.

Each end of the bolster is supported by my improved spring suspension which is entirely of the work absorptive type. Specifically, each bolster end is shaped on its under side to provide a spring seat 27 for receiving the spring band 28 of a semi-elliptic, leaf spring 29 which is symmetrical with respect to the window opening 17 and extends lengthwise of the side frame through openings 30 provided in the columns 16. Each end of the spring 29 is slotted as at 31 (see Fig. 4) and straddles the vertical limb 32 of a hanger link 33 whose lower end is laterally extended to form stub arms 34 on which the end of the spring rests. The upper end of the link 33 is looped around the spring band 36 which clamps an intermediate part of a semi-elliptic, leaf spring 37 (see Fig. 1), the upper side of the band 36 being grooved at 38 to rockably receive the horizontal portion 39 of the link.

As indicated in Fig. 1, the springs 37 are positioned on opposite sides of the bolster and outwardly of the window opening 17. One end of each spring 37 is supported on a radial seat 40 provided on a bolster guide 16 and the opposite end on a similarly shaped seat 41 formed on the roof of that journal box 12 which lies on the same side of the window opening 17.

The springs 37 have a lighter capacity than the springs 29 and are intended to transmit the loads imposed by a lightly loaded or unloaded car and to also absorb the light blows or shocks delivered to the frame and created by wheel or track irregularities, or out of surface rail joints. Under these conditions, the springs 29 act as relatively stiff beams in transferring the bolster load to the links 33 and thence through the springs 37 to the side frames. When the car is fully loaded, means are provided to limit the deflection of the springs 37 in the form of a stop shelf 42 on a continuation of the bottom web 19 along each diagonal tension member 45 of the frame, the shelves limiting downward movement of the links 33. As indicated in Figs. 1 and 4, the members 45 possess a U-section so that the links may contact the shelves. The springs 29 alone have sufficient capacity to carry the fully loaded car.

This spring arrangement distributes the bolster load well over the side frame beyond the window opening 17, the light loads being transmitted through the seats 40 and 41 and the heavier loads through the shelves 42, thus avoiding concentrating the load between the bolster columns or at any other localized part of the frame. It is therefore possible to avoid areas of critical loading on the frame and to accordingly distribute the metal in the frame in a more effective manner for any given strength factor. In general, all of the foregoing features have been combined so that the truck is characterized by good riding qualities, capacity for high speed service, and easy assembly and replacement of the several parts of the truck. In the latter connection, it will be observed that the top web of the compression member is interrupted adjacent each journal box 12 to provide openings 43 through which the springs 37 may be inserted or withdrawn, and openings 44 for a similar purpose are provided in the web 19 for the spring 29. The springs are substantially housed within the side frame whose marginal outline is generally identical with the standard truss frame. Moreover, the swinging support of the links 33 on the springs 37 enables the springs 29 to freely move endwise as the bolster shifts to take up the clearance at the bolster guides.

It will be understood that the invention is not restricted to a spring plankless, radial column truck, but may also be incorporated in the more common type of truck which utilizes spring planks or flat sided bolsters and bolster columns.

I claim:

1. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, and link means directly supporting the last named spring on intermediate portions of the first named springs.

2. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, and link means swingably and directly supporting the last named spring on intermediate portions of the first named springs.

3. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, link means directly supporting the last named spring on intermediate portions of the first named springs, and means limiting the deflection of the first named springs.

4. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, link means directly supporting the last named spring on intermediate portions of the first named springs, and means engageable with the supporting means for limiting the deflection of the first named springs.

5. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, link means swingably and directly supporting the last named spring on intermediate portions of the first named springs, and means limiting the deflection of the first named springs.

6. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, link means swingably and directly supporting the last named spring on intermediate portions of the first named springs, and means engageable with the supporting means for limiting the deflection of the first named springs.

7. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, and means supporting the last named spring on the first named springs.

8. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, and means swingably supporting the last named spring on the first named springs.

9. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, means supporting the last named spring on the first named springs, and means limiting the deflection of the first named springs.

10. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, means supporting the last named spring on the first named springs, and means engageable with the supporting means for limiting the deflection of the first named springs.

11. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, means swingably supporting the last named spring on the first named springs, and means limiting the deflection of the first named springs.

12. In a truck, the combination of a side frame having a compression member, a tension member, bolster guide columns extending between the members and journal boxes at the ends of the members, a bolster guided by the columns, a work absorptive spring bridged between each column and journal box, another work absorptive spring on which the bolster rests disposed below the first named springs, means swingably supporting the last named spring on the first named springs, and means engageable with the supporting means for limiting the deflection of the first named springs.

13. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, means supporting the last named spring on the first named springs, and means on the tension member limiting the deflection of the first named springs.

14. In a truck, the combination of a side frame having a compression member, a tension member, bolster guide columns extending between the members and journal boxes at the ends of the members, a bolster guided by the columns, a work absorptive spring bridged between each column and the adjacent journal box, another work absorptive spring on which the bolster rests disposed below the first named springs, means supporting the last named spring on the first named springs, and means on the tension member engageable with the supporting means for limiting the deflection of the first named springs.

15. In a truck, the combination of a side frame, a bolster operably related to the frame, a spring assembly comprising work absorptive springs supported on the frame on opposite sides of the bolster, another work absorptive spring at a lower elevation than the first named springs on which the bolster rests, the first named springs having a lighter capacity than the last named spring, and link means directly supporting the last named spring on intermediate portions of the first named springs.

16. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, and means supporting the third spring on the first named springs.

17. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests having its ends extending through openings in the columns, and means supporting the ends of the third spring on intermediate portions of the first named springs.

18. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, and means swingably supporting the third spring on the first named springs.

19. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests having its ends extending through openings in the columns, and link means supporting the ends of the third spring and rockably mounted on intermediate portions of the first named springs.

20. In a truck, the combination of a side frame having a compression member, a tension member, bolster guide columns extending between the members and journal boxes at the ends of the members, a bolster guided by the columns, a leaf spring bridged between each column and the top of the adjacent journal box and having an intermediate spring band grooved on its upper side, a third leaf spring on which the bolster rests having its ends extending through openings in the columns, and link means supporting the ends of the third spring and rockably mounted in the band grooves.

21. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, link means supporting the third spring on the first named springs, and means limiting the deflection of the first named springs.

22. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, link means supporting the third spring on the first named springs, and means engageable with the link means for limiting the deflection of the first named springs.

23. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, link means swingably supporting the third spring on the first named springs, and means limiting the deflection of the first named springs.

24. In a truck, the combination of a side frame having a compression member, a tension member, bolster guide columns extending between the members and journal boxes at the ends of the members, a bolster guided by the columns, a leaf spring bridged between each column and the top of the adjacent journal box, a third leaf spring on which the bolster rests, link means swingably supporting the third spring on the first named springs, and means engageable with the link means for limiting the deflection of the first named springs.

25. In a truck, the combination of a side frame having a compression member, a tension member, bolster guide columns extending between the members and journal boxes at the ends of the members, a bolster guided by the columns, a leaf spring bridged between each columns and the top of the adjacent journal box, a third leaf spring on which the bolster rests, link means swingably supporting the third spring on the first named springs, and means on the tension member engageable with the link means for limiting the deflection of the first named springs.

26. In a truck, the combination of a side frame, a bolster operably related to the frame, a spring suspension for transmitting the bolster load to the frame comprising a plurality of work absorptive springs related for serial load transfer, a pair of springs being supported on the frame on opposite sides of the bolster, a third spring on which the bolster rests disposed at a lower elevation than the first named springs, and tie means for directly supporting the third spring on intermediate portions of the first named springs.

27. In a truck, the combination of a side frame, a bolster operably related to the frame, a spring suspension for transmitting the bolster load to the frame comprising a plurality of work absorptive springs related for serial load transfer, a pair of springs being supported on the frame on opposite sides of the bolster, a third spring on which the bolster rests, and link means directly supporting the third spring on intermediate portions of the first named springs and having provision for accommodating endwise movements of the third spring as the bolster moves relative to and lengthwise of the side frame.

28. In a truck, the combination of a side frame, a bolster operably related to the frame, a spring suspension for transmitting the bolster load to the frame comprising a plurality of work absorptive springs related for serial load transfer, a pair of springs being supported on the frame on opposite sides of the bolster, a third spring on which the bolster rests, disposed at a lower elevation than the first named springs, the first named springs having a lower capacity than the third spring, and tie means for directly supporting the third spring on intermediate portions of the first named springs.

29. A side frame for a railway car truck having a compression member, a tension member, bolster guide columns extending between the members, journal boxes at the ends of the members, and a spring seat on each column and the roof of each journal box for supporting the ends of a leaf spring.

30. A side frame for a railway car truck having a compression member, a tension member, bolster guide columns extending between the members, journal boxes at the ends of the members, a spring seat on each column and the roof of each journal box for supporting the ends of a leaf spring, and stops on the tension member for limiting the deflections of the springs.

31. In a truck, the combination of a side frame having a compression member, a tension member, bolster guide columns extending between the members and journal boxes at the ends of the members, a spring seat on each column and the roof of each journal box, a bolster guided by the columns, a spring suspension for transmitting the bolster load to the frame comprising a plurality of springs related for serial load transfer, a pair of the springs being supported on the spring seats, a third spring on which the bolster rests, and means for supporting the third spring on the pair of springs.

32. A spring suspension for a hollow truck side frame having journal boxes and spaced bolster columns for receiving the end of a bolster comprising a leaf spring bridged between each column and the top of the adjacent journal box, a third leaf spring positioned centrally of the frame for loading by the bolster, and means supporting the ends of the third spring on intermediate portions of the first named springs.

33. A spring suspension for a hollow truck side frame having journal boxes and spaced bolster columns for receiving the end of a bolster comprising a leaf spring bridged between each column and the top of the adjacent journal box, a third leaf spring positioned centrally of the frame for loading by the bolster, the first named springs having a lower capacity than the third spring, means for limiting the deflection of the first named springs, and means supporting the ends of the third spring on intermediate portions of the first named springs.

34. In a truck, the combination of a hollow side frame, a bolster operably related to the frame, a spring assembly comprising work absorptive springs supported on and within the frame on opposite sides of the bolster, another work absorptive spring at a lower elevation than the first named springs on which the bolster rests, and link means directly supporting the last named spring on intermediate portions of the first named springs, the spring assembly being so proportioned, constructed and arranged that all parts thereof are included within the marginal outline of the frame.

35. In a truck, the combination of a hollow side frame having a compression member, a tension member including diagonal tension portions, bolster guide columns extending between the members and journal boxes at the ends of the members, the portions joining the compression member inwardly of the boxes, a bolster guided by the columns, a spring assembly within the frame comprising a work absorptive spring bridged between each column and box, another work absorptive spring on which the bolster rests disposed below the first named springs, and means supporting the last named spring on the first named springs, the spring assembly being so proportioned, constructed and arranged that all parts thereof are included within the marginal outline of the frame.

MARK H. MARTIN.